(12) United States Patent
Rangnekar et al.

(10) Patent No.: US 6,845,084 B2
(45) Date of Patent: Jan. 18, 2005

(54) ROUTING PROTOCOL SELECTION FOR AN AD HOC NETWORK

(75) Inventors: Aniruddha Rangnekar, Baltimore, MD (US); Stephen Quirolgico, Columbia, MD (US)

(73) Assignee: TSYS Acquisition Corp., Annapolis, MD (US)

( * ) Notice: Subject to any disclaimer, the term of this patent is extended or adjusted under 35 U.S.C. 154(b) by 97 days.

(21) Appl. No.: 10/028,267

(22) Filed: Dec. 28, 2001

(65) Prior Publication Data

US 2003/0123419 A1 Jul. 3, 2003

(51) Int. Cl.7 .................................................. H04L 12/28
(52) U.S. Cl. ................................................... 370/254
(58) Field of Search ............................... 370/254–255, 370/310, 338, 347, 349, 351, 400, 901, 464–465, 241, 252; 709/220, 230, 238

(56) References Cited

U.S. PATENT DOCUMENTS

| | | | |
|---|---|---|---|
| 5,251,205 A | * 10/1993 | Callon et al. ............... | 370/392 |
| 5,548,727 A | 8/1996 | Meehan ....................... | 709/221 |
| 6,304,556 B1 | 10/2001 | Haas ............................ | 370/254 |
| 2001/0010689 A1 | * 8/2001 | Awater et al. .............. | 370/344 |
| 2002/0012381 A1 | * 1/2002 | Mattisson et al. .......... | 375/132 |
| 2002/0059434 A1 | * 5/2002 | Karaoguz et al. ........... | 709/228 |
| 2002/0176366 A1 | * 11/2002 | Ayyagari et al. ............ | 370/245 |

* cited by examiner

*Primary Examiner*—Seema S. Rao
*Assistant Examiner*—Kevin C. Harper
(74) *Attorney, Agent, or Firm*—William H. Bollman (57) ABSTRACT

An ad hoc network includes a set of nodes. A source node in the network attempting to transmit a message to a destination node in the network establishes a common routing protocol between nodes in the network. The source node transmits a request for routing protocol information to a limited number of nodes in the network. The source node receives the routing protocol information from the limited number of nodes and selects a common routing protocol based on the received information. The source node transmits the selected common routing protocol to the nodes in the network.

28 Claims, 5 Drawing Sheets

ROUTING PROTOCOL SELECTION FOR AN AD HOC NETWORK

FIELD OF THE INVENTION

The invention is generally related to computer networks. More particularly, the invention is related to routing protocol selection in an ad hoc network.

BACKGROUND OF THE INVENTION

Currently, there is a trend toward a ubiquitous computing environment where information is available to users at any time and at any place. This trend has been facilitated, in part, by a growing demand for wireless devices. Recently, there has been a trend in developing wireless, infrastructureless network technologies to facilitate direct communication between two wireless devices. When two or more devices directly communicate using a wireless, infrastructureless network technology, they form a type of local area network, known as an ad hoc network. Wireless devices may become part of the network when they are located within the range of a device in the network. Each device (or node) in the ad hoc network could serve as a client, host, or router. Currently, a number of wireless technologies exist for supporting ad hoc networks including Bluetooth, IrDA, and 802.11. Ad hoc networks are not limited to wireless devices and some or all of the devices in an ad hoc network may use temporary plug-in connections that allow these devices to temporarily be part of the network, such as for the duration of a communications session, and communicate via wired or wireless connections.

Figure 5:
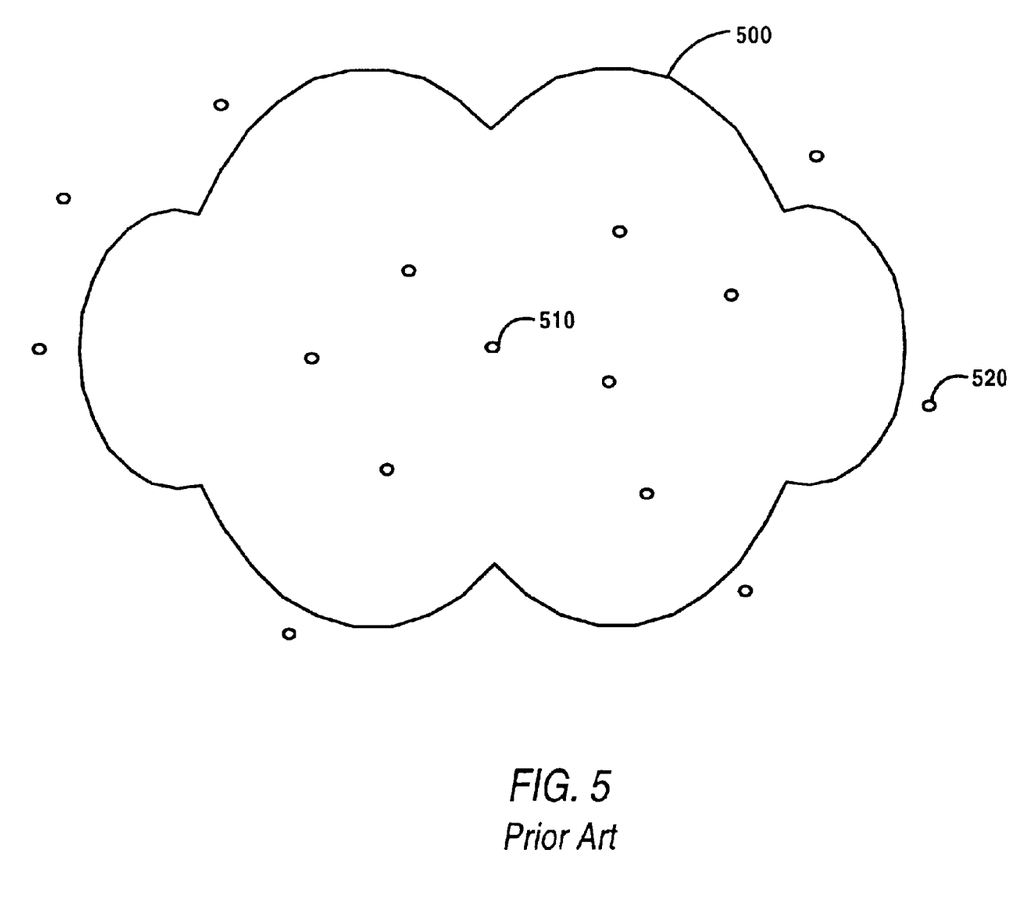
FIG. 5 illustrates a conventional ad hoc network.

FIG. 5 illustrates a conventional ad hoc network 500 including a set of nodes. The network 500 may use, for example, Bluetooth®, IrDA®, or IEEE 802.11 specifications. Nodes may be mobile and can move in and out of the network 500. A node 510, for example is a node in the network 500 and a node 520 is an example of a node outside the network 500. Either of these nodes may represent mobile devices that can move in and out of the network 500.

Ad hoc networks and other networks typically rely on routing protocols in order to communicate messages from a source node to a destination node through a set of intermediary nodes. In an ad hoc network, routing is a non-trivial task as nodes can move unpredictably. This behavior causes topological changes that require robust and flexible methods to discover and maintain routes. The development of ad hoc routing protocols is motivated in part by a need to enhance the communication capabilities of current wireless technologies (e.g., Bluetooth®) by allowing a node to communicate with another node that is outside of its transmission range.

The effectiveness of routing in an ad hoc network depends on the ability to provide timely information about the topology of the network to the nodes. In an ad hoc network, significant rates of topological change are expected; consequently, the distribution of routing information can easily saturate the network. This problem is exacerbated by the limited bandwidth available on the wireless links. Therefore, a protocol selection method should minimize the exchange of information to minimize network traffic.

In response to the severe constraints imposed by ad hoc networks, several protocols have been proposed that attempt to derive near-optimal solutions for the ad hoc routing problem. Such protocols include Ad hoc On-Demand Distance Vector (AODV), Dynamic Source Routing (DSR), Temporally-Ordered Routing Algorithm (TORA), Landmark Routing Protocol (LANMAR), and Fisheye State Routing Protocol (FSR).

Most research in the area of ad hoc routing assumes the existence of a common routing protocol to be used by all of the nodes in the network. However, the standardization of ad hoc routing protocols is in a nascent phase and many such protocols may exist in future ad hoc networks. In fact, it is possible that many of these protocols will become standardized in the near future. If this is the case, then it is possible that ad hoc networks will be comprised of nodes that are capable of using one or more ad hoc routing protocols. For example, the node 510 may currently be using a first routing protocol, and the node 520 may currently be running a second routing protocol for a second network outside the network 500. The nodes may store multiple routing protocols for use with nodes running different protocols.

In an ad hoc network where nodes may use different ad hoc routing protocols, a common ad hoc routing protocol among the nodes in the network should be established to facilitate communication between two nodes.

SUMMARY OF THE INVENTION

An embodiment of the invention includes a method of selecting a common routing protocol in an ad hoc network having a set of nodes. The method comprises steps of transmitting a request for routing protocol information to a limited number of nodes. The limited number of nodes includes a number of nodes less than the set of nodes in the ad hoc network. The steps also include receiving routing protocol information from one or more of the limited number of nodes; selecting a common routing protocol based on the received routing protocol information; and transmitting information associated with the selected common routing protocol to the set of nodes.

Another embodiment of the invention includes a method of selecting a routing protocol for use in a node in an ad hoc network. The method comprises steps of receiving a first message identifying a first routing protocol; receiving a second message identifying a second routing protocol; and selecting one of the first and second routing protocols for use in the node.

Yet another embodiment of the invention includes an ad hoc network system comprising a set of nodes in an ad hoc network. Each of the set of nodes is configured to use one of a set of routing protocols. A source node in the network transmits a request for routing protocol information to nodes within a predetermined number of hops from the source node. The source node receives protocol information from the nodes within the predetermined number of hops. The source node selects a common routing protocol based on the received routing protocol information, and the source node transmits the selected common routing protocol to the set of nodes.

Yet another embodiment of the invention includes a source node of a set of nodes in an ad hoc network. The source node comprises a transmitter transmitting a request for routing protocol information to nodes within a predetermined number of hops from the source node; a receiver receiving protocol information from the nodes within the predetermined number of hops; a memory storing the received protocol information; and a processor selecting a common routing protocol based on the received routing protocol information for transmission to the set of nodes through the transmitter.

The methods of the present invention include steps that may be performed by computer-executable instructions executing on a computer-readable medium.

Those skilled in the art will appreciate these and other aspects of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
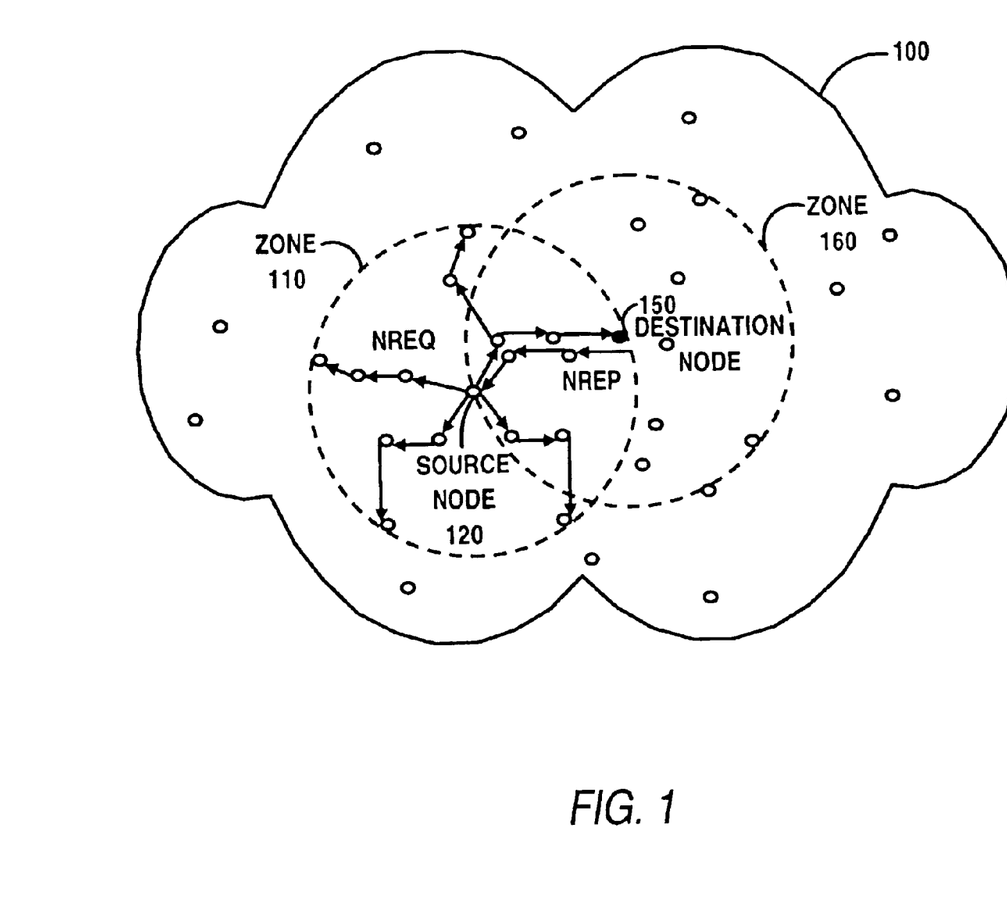
FIG. 1 illustrates an exemplary system according to an embodiment of the invention.

FIG. 1 illustrates an exemplary ad hoc network 100 according to an embodiment of the invention. A set of nodes is shown in the network 100. Some or all of the nodes may be capable of using multiple routing protocols within the network 100.

Each node in the network 100 should run the same routing protocol to facilitate communication between two nodes in the network 100. Accordingly, a protocol selection process for selecting a common routing protocol among the nodes in the network 100 may be initiated by a source node attempting to transmit a message to a destination node. The common routing protocol is a routing protocol that is selected and eventually may be used by all the nodes in the network 100 to facilitate multi-hop communication within the network 100.

For example, a source node 120 is shown in the network 100. The source node 120 desires to communicate with a destination node 150, (not necessarily) in the network 100. The source node 120 checks its routing table to determine whether it contains a route to the destination node 150. Every node in the network 100 may maintain a routing table that contains routes to the nodes in the network 100. In general, if any source node wants to communicate with another node (i.e., the destination node), it checks for the destination node in its routing table. If the entry is not present in the routing table, the source node initiates a protocol selection process according to an embodiment of the invention.

Returning to the example, if the routing table in the source node 120 does not include a route to the destination node 150, the protocol selection process is initiated. A zone 110 is selected for querying a subset of the nodes in the network 100 for protocol routing information. To reduce the number of messages associated with querying all nodes in the network 100, a zone is used to sample a subset of the nodes in the network 100.

More specifically, each node in the network 100 is associated with a respective zone that contains all the nodes within a zone radius. The zone radius defines the size of the zone around a node in terms of a number of hops. To reduce the number of messages, the source node queries only those nodes within the associated zone for routing protocol information, which is used to select a common routing protocol. This potentially reduces the amount of traffic in the network 100.

The zone 110 for the source node 120, for example, may include all nodes that are within two hops (i.e., the zone radius) from the destination node 120. The zone radius preferably includes approximately four to five hops. However, the number of hops in the zone radius may vary and may be predetermined.

The source node 120 broadcasts a negotiation request (NREQ) message containing the different protocols that the source node 120 may support. For example, the source node 120 creates a packet (e.g., an NREQ packet) and inserts a protocol vector therein. The arrows in FIG. 1 illustrate the transmission of the NREQ packet from the source node 120 to the nodes in the zone 110. The NREQ packet is transmitted only to the nodes in the zone 110. This is done by initializing the time-to-live (TTL) field, which may be in the NREQ packet header, to the zone radius (e.g., two hops). Although multiple arrows are shown as originating from the source node 120, a single transmission may be used to propagate the NREQ packet to all the nodes in the zone 110. The NREQ packet is transmitted until the TTL is zero.

Every node that receives an NREQ packet in the zone 110, decrements the TTL and rebroadcasts the packet until the TTL reaches zero. All the nodes in the zone 110 get the NREQ packet, and the NREQ packet is not propagated outside the zone 110. Thus, the sample space is restricted to the source node's zone.

Upon receiving the NREQ packet containing the NREQ protocol vector, each node in the zone 110 determines which of the protocols in the NREQ protocol vector are acceptable to it. In a preferred embodiment, the main criterion for selecting a routing protocol should be restricting the change of currently used routing protocols. Every node should give highest preference to the routing protocol that it is currently using. A node may also send a list of other protocols that it may support. In this way the source node can consider the other protocols currently used by the nodes for selecting a common routing protocol. If there is no majority of currently used routing protocols, then the source node 120 considers the routing protocols available at each node. The source node can then find the routing protocol that is available at a plurality of the nodes and selects it as the new routing protocol.

Each node in the zone 110 generates a negotiation response (NREP) packet in response to receiving the NREQ packet. For example, the node 150 in the zone 110 generates an NREP packet and transmits the packet to the source node 120. The NREP packet includes an protocol vector that includes the currently used routing protocol of the node 150 and the list of other protocols available to the node 150, such as other protocols that are stored at the node 150 but are not currently being used. This NREP packet is then broadcast within its zone (i.e., the zone 160). The TTL of the NREP packet is set to a zone radius 160 for the node 150 transmitting the NREP packet to restrict the propagation of the message. In this example, the zone radius of the zone 160 is equal to the zone radius of the zone 110. Since the node 150 is within the zone 110 of the source node 120, it follows that the source node 120 falls under the zone 160 of the node 150. Thus, this reply will be propagated to the source node 120.

FIG. 1 illustrates that the destination node 150 receives the NREQ packet, because the destination node 150, in this example, happens to be within the zone 110 of the source node 120. The destination node 150, however, may be outside the zone 110 and can be located anywhere in the network 100, because a common protocol is eventually transmitted to all the nodes in the network 100, as described in detail below.

After sending the protocol vector in the NREQ packet, the source node 120 waits for a specific interval of time (NREQ_WAIT_TIME). This timeout period can be determined by a predetermined maximum round trip delay that a packet takes to travel to a border node and back. Border nodes, for any node, are those nodes that are exactly zone radius number of hops away from the source node. This timeout interval is a sufficient period of time for replies (i.e., NREP packets) from all the nodes in the zone 110 to reach the source node 120. During this timeout interval, the source node 120 may receive replies from multiple nodes within its zone 110. These replies are stored at the source node 120. For example, the NREP protocol vectors from the replies are stored and used to select a common routing protocol. At the end of the NREQ_WAIT_TIME time interval, the source node 120 processes the cached replies and selects a common routing protocol based on the criteria described above.

For each routing protocol, the source node 120 calculates the number of nodes that are currently using that protocol. If the nodes that are currently using the same routing protocol are in a majority, then the source node 120 selects that protocol as the common routing protocol. If there is no distinct majority, then the source node 120 selects a routing protocol that is available at a plurality of the nodes in the zone 110. It uses the returned protocol vector (e.g., the currently used routing protocol and list of available routing protocols to the node) in the received NREP packets to select a common routing protocol.

Since the source node 120 makes the final decision in selecting a common routing protocol, it needs to convey this decision to all the other nodes in the network 100. The source node 120 may broadcast a message (i.e., a RESULT message) to the network 100 including the common routing protocol.

Preferably, the information transmitted in the NREQ protocol vector in the NREQ packet transmitted from the source node 120, the information transmitted in the NREP protocol vector in each of the NREP packets transmitted from the nodes within the zone 110, and the selected common routing protocol transmitted from the source node 120 each include protocol identifiers (e.g., a list of one or more protocols identified by a name) rather than the actual protocol itself (i.e., the protocol object). This significantly reduces the amount of information transmitted in each of the packets. However, the actual protocol object can be piggybacked with a packet. For example, protocol objects may be transmitted in packet payloads.

The responsibility of finding the protocol object lies with the nodes that don't have the protocol object for the common routing protocol broadcast in the RESULT messages from the source node 120. A node can obtain the protocol object for the common routing protocol using one of many conventional techniques, such as the expanded-ring search. Initially, such a node will query its neighbors for the protocol object, by sending a protocol request (PREQ) packet with a TTL of 1. If any of its neighbors have that protocol, they will send it to the node. If the node doesn't get a reply within a specific timeframe (PREQ_WAIT_TIME), it will timeout and expand the scope of its search by increasing the TTL of the next query message. Thereafter, following each timeout the TTL is incremented by TTL_INCREMENT until TTL=TTL_THRESHOLD is reached. Thus, as long as at least one node in the network has that protocol, this node will find the protocol.

A RESULT message selection technique may be used by the nodes in the network 100 receiving multiple RESULT messages from different source nodes. This technique allows all the nodes in the network 100 to maintain the same common routing protocol. A node in the network 100 accepts the first RESULT message that it receives. After that, all RESULT messages, within a certain time period (RESULT_WAIT_TIME), are rejected, unless a source ID in any RESULT message received during the RESULT_WAIT_TIME is less than the ID of the source of the current accepted RESULT message, which may be the first RESULT message accepted by the node. If the ID of the source of the new RESULT message is less than that of the current accepted RESULT message, the new RESULT message is accepted. This technique, for example, protects against the scenario where two nodes, far apart from each other, both want to send data. Both of them start a routing protocol selection, query their respective zones, and come up with two different common routing protocols. Now both of them will broadcast their decision to the network. Depending on the position of the node with respect to these two sources, the node will receive either one of these RESULT messages. The above-mentioned technique forces all the nodes to chose and accept the same RESULT message.

Figure 2:
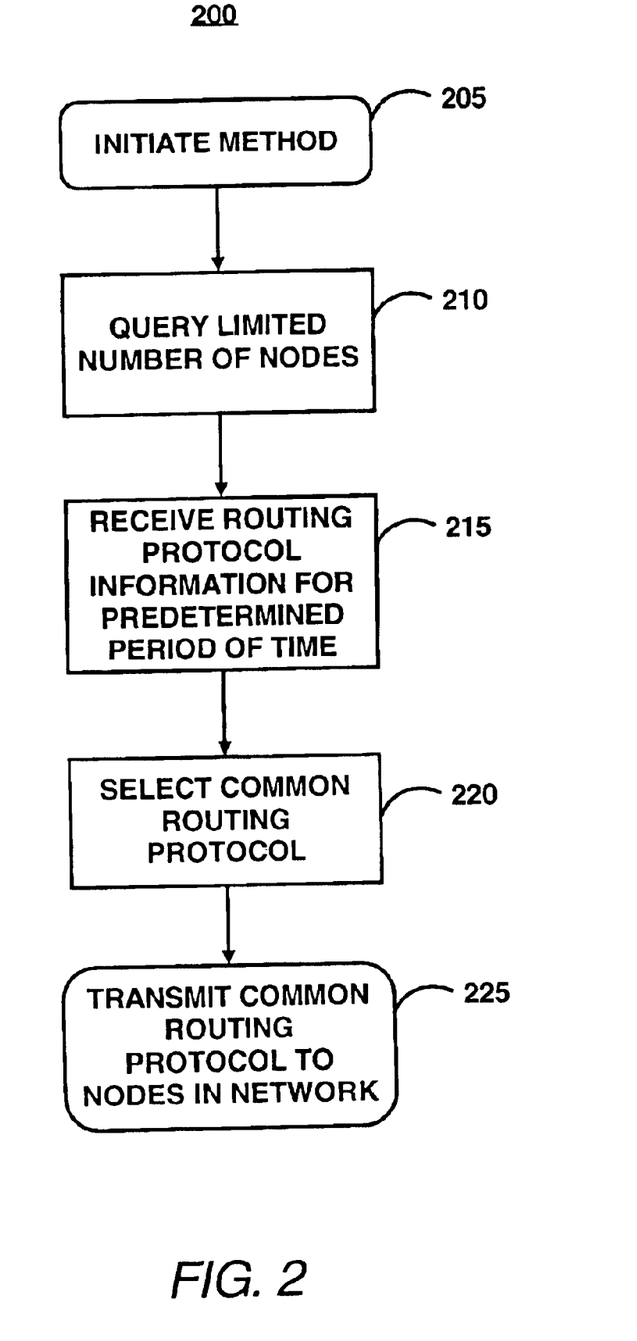
FIG. 2 illustrates a flow chart of an exemplary method for selecting a routing protocol according to an embodiment of the invention.

FIG. 2 illustrates an exemplary method 200 for implementing a common routing protocol in an ad hoc network according to an embodiment of the invention. In step 205, the method 200 is initiated. The method 200 may be initiated when a source node does not have a route to a destination node in its routing table. Also, the method 200 may be initiated when a node (or a group of nodes) joins the network. In this case all the nodes that are within transmission range of the new node would, at some point, automatically initiate the selection process. Accordingly, two networks may be merged, such that they use the same routing protocol.

In step 210, the source node queries a limited number of nodes in the network for routing protocol information, such as the routing protocol currently used in each node and routing protocols that are available for use in each of the nodes. For example, the source node 120 transmits the NREQ packet to the nodes in the zone 110.

In step 215, the source node receives routing protocol information for a predetermined period of time from the queried nodes and stores the received routing protocol information. For example, the source node 120 receives NREP packets from the queried nodes in the zone 110 during the NREQ_WAIT_TIME, which may be determined by the maximum round trip delay that a packet takes to travel to a border node and back in the zone 110.

In step 220, the source node selects a common routing protocol using predetermined selection criteria. For example, the source node calculates the number of nodes that are currently using the same protocol. If the number of nodes that are currently using the same routing protocol are a majority of the queried nodes that the source node received a reply from, then the source node selects that protocol as the common routing protocol. If there is no distinct majority, then the source node selects a routing protocol that is available at a plurality of the queried nodes.

In step 225, the source node transmits the selected common routing protocol to the entire network. For example, the source node broadcasts an identifier identifying the common routing protocol to the entire network. The nodes receive the identifier of the common network protocol, retrieve the common routing protocol object and implement the object. If a node in the network does not have the selected common routing protocol object, then the node may retrieve the object from neighboring nodes using conventional techniques.

Figure 3:
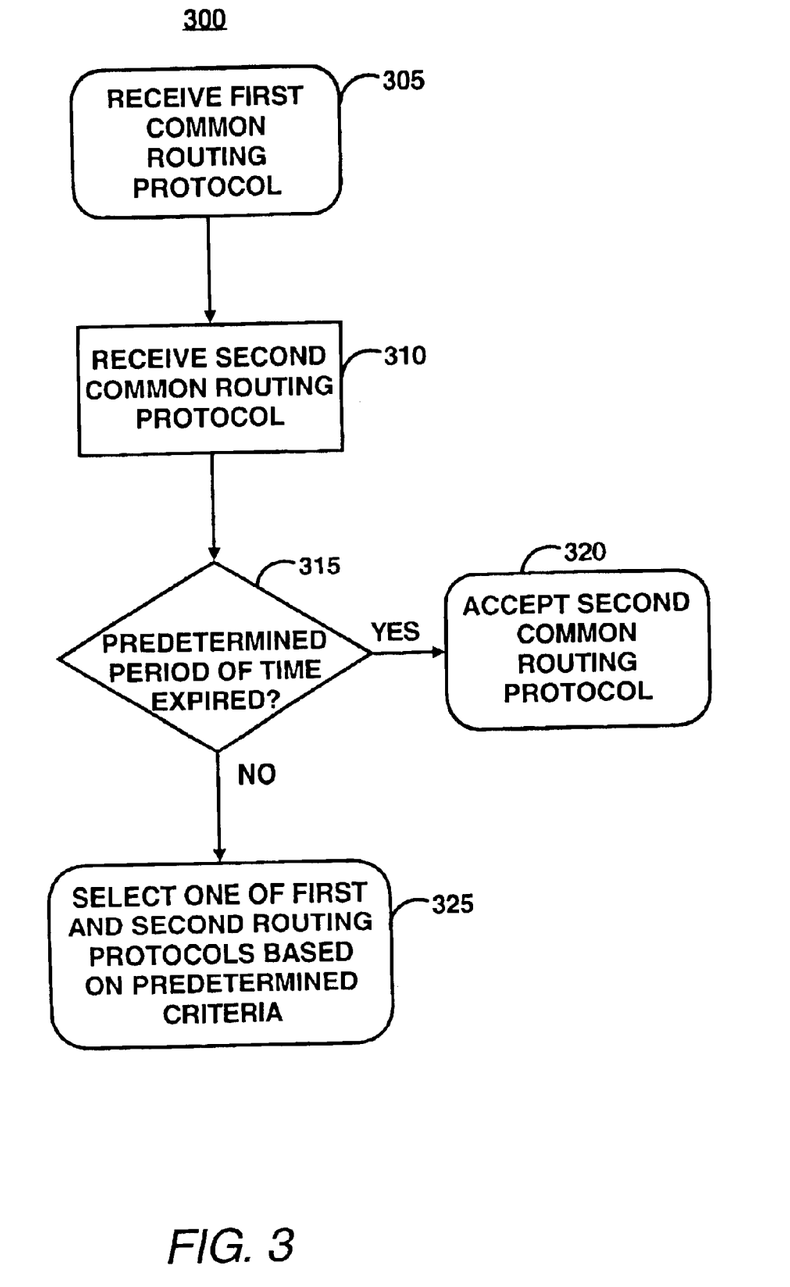
FIG. 3 illustrates a flow chart of an exemplary method for selecting a common routing protocol from a set of decided protocols according to an embodiment of the invention.

In some instances, a node in the ad hoc network may receive more than one message including different common routing protocols. For example, as described above, two nodes (i.e., source nodes), far apart from each other, both want to send data. Both of them initiate a routing protocol selection, query their respective zones, and come up with two different common routing protocols. Now both of the source nodes broadcast their selected common routing protocols to the network. Depending on the position of a node receiving both selected common routing protocols, the node will receive either one of the common routing protocols first. FIG. 3 illustrates an exemplary method 300 according to an embodiment of the invention for implementing the same common routing protocol in nodes in an ad hoc network.

In step 305, a node in the network receives a first message including a first common routing protocol to be accepted for used by the node. In step 310, the node receives a second message including second common routing protocol to be accepted for use by the node.

In step 315, the node determines whether a predetermined period of time is expired since the first message was received. If the predetermined period of is expired, then the second common routing protocol is accepted and the second common routing protocol is used by the node (step 320).

If the predetermined period of time is not expired, as determined in step 315, the node selects either the first or second common routing protocol to accept for use based on predetermined criteria (step 325). For example, the predetermined criteria may be based on the source node identification (id) of the source node transmitting the message. If the source node id of the second message is less than the source node id of the first message, then the second common routing protocol is accepted. Alternatively, the second common routing protocol may be rejected if the source node id of the second message is more than the source node id of the first message. One of ordinary skill in the art will readily recognize that the selection criteria may be based on one or more factors and is not limited to being based on a source node id. Furthermore, any selection criteria may be used that results in one common routing protocol being selected during the predetermined period of time.

The methods 200 and 300 can be performed by a computer program. The computer program can exist in a variety of forms both active and inactive. For example, the computer program and objects can exist as software comprised of program instructions or statements in source code, object code, executable code or other formats; or firmware program (s). Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

Figure 4:
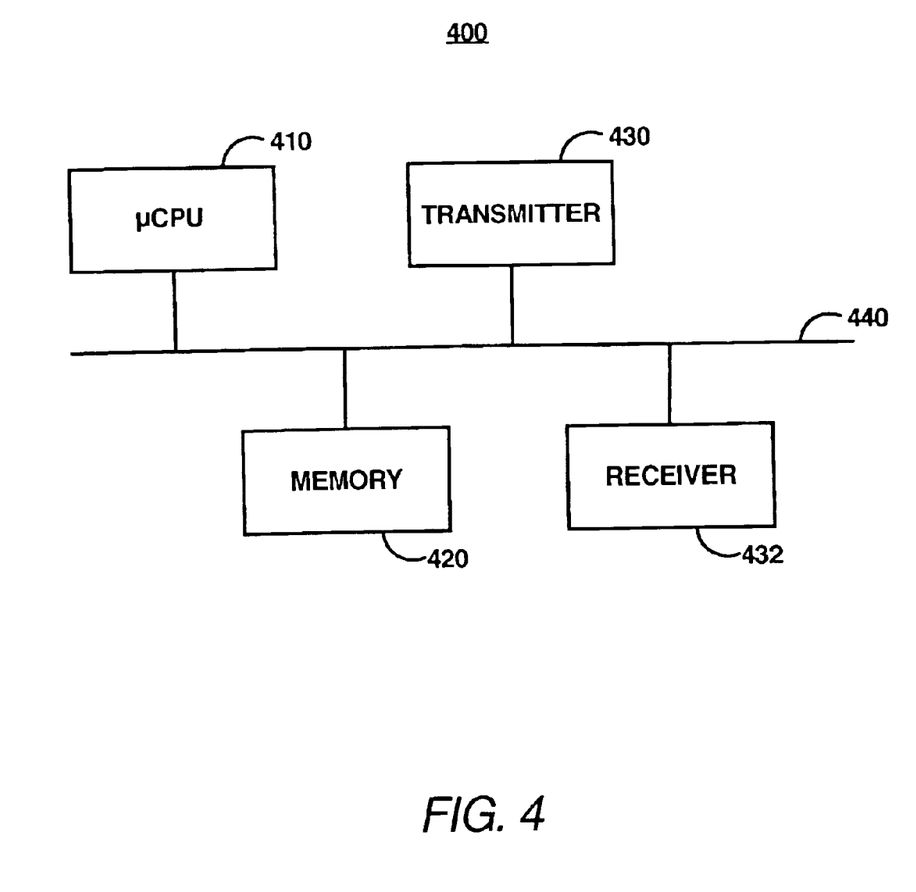
FIG. 4 illustrates a block diagram of an exemplary node according to an embodiment of the invention.

FIG. 4 illustrates an exemplary block diagram of a node 400 in an ad hoc network that may be used in the invention. The node 400 may include a processor 410 connected to a memory 420, a transmitter 430, and a receiver 432 via a bus 440. The processor 410 may execute one or more computer programs stored in the memory 420 to implement the methods 200 and 300 described above. The memory 420 may include one or more of volatile, nonvolatile, hard drive, etc. Protocol information received from nodes for selecting a common routing protocol may also be stored in the memory 420, such as in a database, table, etc. The transmitter 430 and the receiver 432 are operable to transmit/receive messages to other nodes in the ad hoc network, such as the network 100. The node 400 may function as a source node, a destination node, etc. that facilitates communication in the ad hoc network. Other conventional elements, not shown, may be included in the node 400 that facilitate conventional functions of a node in an ad hoc network.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of selecting a common routing protocol in an ad hoc network having a set of nodes, the method comprising steps of:

transmitting a request for routing protocol information to a limited number of nodes, the limited number of nodes including a number of nodes less than the number of nodes in the ad hoc network;

receiving routing protocol information from one or more of the limited number of nodes;

selecting a common routing protocol based on the received routing protocol information; and transmitting information associated with the selected common routing protocol to all the nodes in the network.

2. The method of claim 1, wherein the selected common routing protocol is a routing protocol to be used by the set of nodes to facilitate multi-hop communication within the ad hoc network and the step of transmitting information further comprises transmitting at least one of an identification of the selected common routing protocol and a selected common routing protocol object to all the nodes in the network.

3. The method of claim 1, wherein the set of nodes are configured to use one of a set of routing protocols, and the routing protocol information transmitted from each of the limited number of nodes comprises a currently used routing protocol and one or more routing protocols that are available for use.

4. The method of claim 3, wherein the step of selecting further comprises steps of:

determining whether a majority of the limited number of nodes is currently using a same routing protocol;

selecting the same routing protocol as the common routing protocol in response to the majority currently using the same routing protocol; and selecting a routing protocol that is available for use to a largest number of the limited number of nodes in response to no majority existing.

5. The method of claim 1, wherein the step of selecting further comprises steps of:

storing the received routing protocol information in a memory; and retrieving the stored routing protocol information from the memory after a predetermined period of time; and selecting the common routing protocol based at least on the retrieved routing protocol information.

6. The method of claim 1, wherein the steps of claim 1 are performed by a source node, and the limited number of nodes are in a zone, the zone having a radius based on a predetermined number of hops from the source node.

7. The method of claim 1, wherein the network comprises a source node configured to transmit a message to a destination node, and further comprising steps of:

the source node determining whether a route to the destination node is included in a routing table for the source node in order to transmit a message to the destination node; and the source node performing the steps of claim 1 in response to the route not being included in the routing table.

8. A method of selecting a routing protocol for use in a node in an ad hoc network, the method comprising steps of:

receiving a first message identifying a first routing protocol;

receiving a second message identifying a second routing protocol; and selecting one of the first and second routing protocols for use in the node;

wherein the step of selecting further comprises steps of:

determining whether a predetermined period of time since the first message was received is expired;

selecting the second routing protocol in response to the predetermined period of time bring expired; and selecting one of the first and second routing protocols for use in the node based on predetermined criteria in response to the predetermined period of time not being expired;

determining whether the source node identification for the second message is less than the source node identification for the first message in response to the predetermined period of time not being expired;

selecting the second routing protocol for use in response to the source node identification for the second message being less than the source node identification for the first message; and selecting the first routing protocol for use in response to the source node identification for the second message not being less than the source node identification for the first message.

9. An ad hoc network system comprising:

a set of nodes in an ad hoc network, each node being configured to use one of a set of routing protocols, wherein a source node in the network transmits a request for routing protocol information to nodes within a predetermined number of hops from the source node;

the source node receives protocol information from the nodes within the predetermined number of hops;

the source node selects a common routing protocol based on the received routing protocol information; and the source node transmits information associated with the selected common routing protocol to the whole network.

10. The system of claim 9, wherein the common routing protocol includes a routing protocol to be used by the set of nodes to facilitate multi-hop communication within the ad hoc network.

11. The system of claim 10, wherein the routing protocol information transmitted comprises a currently used routing protocol and one or more available routing protocols that are available for use to the nodes within the predetermined number of hops.

12. The system of claim 11, wherein the common routing protocol is a routing protocol currently used by a majority of the nodes within the predetermined number of hops.

13. The system of claim 11, wherein the common routing protocol is a routing protocol that is available for use to a largest number of the nodes within the predetermined number of hops.

14. A source node of a set of nodes in an ad hoc network, the source node comprising:

a transmitter transmitting a request for routing protocol information to nodes within a predetermined number of hops from the source node;

a receiver receiving protocol information from the nodes within the predetermined number of hops;

a memory storing the received protocol information; and a processor selecting a common routing protocol based on the received routing protocol information for transmission to all the nodes in the network through the transmitter.

15. The source node of claim 14, wherein the processor retrieves the received routing protocol information from the memory after a predetermined period of time from the transmission of the request.

16. The source node of claim 15, wherein the period of time is based on a maximum time for a message to travel the predetermined number of hops from a node and return to that node.

17. The source node of claim 14, wherein the routing protocol information comprises a currently used routing protocol and one or more routing protocols that are available for use to the nodes within the predetermined number of hops.

18. The source node of claim 17, wherein the selected common routing protocol includes one of a routing protocol currently used by a majority of the nodes within the predetermined number of hops and a routing protocol that is available for use to a largest number of the nodes within the predetermined number of hops.

19. Apparatus for selecting a common routing protocol in a network having a set of nodes, comprising:

a transmitter to transmit a request for routing protocol information to a limited number of said nodes, said limited number of said nodes being less than a total number of nodes in said network;

a receiver to receive routing protocol information from one or more of said limited number of said nodes;

a selector to select a common routing protocol based on said received routing protocol information;

a transmitter to transmit information associated with said selected common routing protocol to all nodes in said network.

20. The apparatus for selecting a common routing protocol in a network having a set of nodes according to claim 19, wherein:

said selected common routing protocol is a routing protocol to be used by said nodes to facilitate multi-hop communication within said network; and said transmitter further transmits at least one of an identification of said selected common routing protocol and a selected common routing protocol object to all said nodes in said network.

21. The apparatus for selecting a common routing protocol in a network having a set of nodes according to claim 19, wherein:

said nodes are configured to use one of a set of routing protocols, and said routing protocol information transmitted from each of said limited number of nodes comprises a currently used routing protocol and one or more routing protocols that are available for use.

22. Apparatus for selecting a common routing protocol in a network having a set of nodes, comprising:

means for transmitting a request for routing protocol information to a limited number of nodes, said limited number of nodes including a number of nodes less than a number of nodes in said network;

means for receiving routing protocol information from one or more of said limited number of nodes;

means for selecting a common routing protocol based on said received routing protocol information; and means transmitting information associated with said selected common routing protocol to all said nodes in said network.

23. A method of selecting a common routing protocol in a network having a set of nodes, comprising:

configuring each node in a network to use one of a set of routing protocols;

transmitting from a source node a request for routing protocol information to nodes within a predetermined number of hops from said source node;

receiving protocol information by said source node from said nodes within said predetermined number of hops;

selecting a common routing protocol by said source node based on said receiving routing protocol information;

transmitting information associated with said selected common routing protocol from said source node to sail network.

24. The method of selecting a common routing protocol in a network set of nodes according to claim 23, wherein:

said common routing protocol includes a routing protocol to be used by said set of nodes to facilitate multi-hop communication within said network.

25. The method of selecting a common routing protocol in a network having a set of nodes according to claim 24, wherein:

said routing protocol comprises a currently used routing protocol and one or more available routing protocols that are available for use to sad nodes within said predetermined number of hops.

26. The method of selecting common routing protocol in a network having a set of nodes according to claim 23, wherein:

said common routing protocol is a routing protocol currently used by a majority of said nodes within said predetermined number of hops.

27. The method of selecting common routing protocol in a network having a set of nodes according to claim 23, wherein:

said common routing protocol is a routing protocol that is available for use to a largest number of said nodes within the predetermined number of hops.

28. Apparatus for selecting a common routing protocol in a network having a set of nodes, comprising:

means for configuring each node in a network to use one of a set of routing protocols;

means for transmitting from a source node a request for routing protocol information to nodes within a predetermined number of hops from said source node;

means for receiving protocol information by said source node from said nodes within said predetermined number of hops;

means for selecting a common routing protocol by said source node based on said receiving routing protocol information;

means for transmitting information associated with said selected common routing protocol from said source node to said network.

* * * * *